United States Patent Office 2,986,562
Patented May 30, 1961

2,986,562
RESERPIC AND DESERPIDIC ACID LACTONE DIENES

Charles Ferdinand Huebner, Chatham, N.J., assignor to Ciba Pharmaceutical Products, Inc., Summit, N.J., a corporation of New Jersey No Drawing. Filed May 29, 1956, Ser. No. 587,922

2 Claims. (Cl. 260—287)

This invention relates to a new process for the preparation of valuable organic compounds, and certain intermediates obtained thereby. More particularly, the invention is concerned with a new process for the preparation of compounds having the allo-yohimbane structure, especially lactones of the formula:

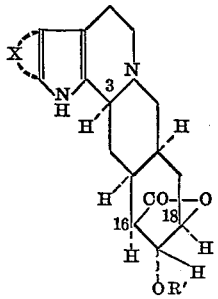

the corresponding 18-hydroxy-16-carboxylic acids and the alkyl 18-hydroxy-16-carboxylates, and salts thereof, wherein X represents the unsubstituted or substituted remainder of a benzene nucleus and R' stands for lower alkyl. The substituents of the benzene nucleus may be for example halogen atoms, e.g. chlorine, bromine or fluorine; lower alkyl, e.g. methyl or ethyl; or preferably lower alkoxy, e.g. methoxy, ethoxy or methylenedioxy. These substituents are advantageously in the 10- and/or 11-position of the reserpine ring skeleton, preferably in the 11-position. R' represents especially methyl or ethyl. They are intermediates in the preparation of compounds which are used in the synthesis of pharmacologically active compounds such as reserpine, deserpidine or rescinnamine.

The lactones or salts thereof obtained according to the process of the invention can be converted into compounds of the following formula:

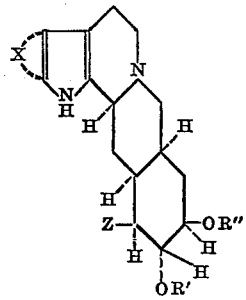

wherein X and R' have the above-mentioned meanings and Z stands for —COOH or COOR, R being a lower alkyl residue and R" represents hydrogen or an acyl residue, or salts thereof by customary methods. Upon treatment of the lactones with hydrolyzing or alcoholizing agents such as alkali or earth alkaline metal hydroxides, carbonates, lower alcoholates or amines the lactone ring can be split. The compounds thus obtained having a free or esterfied carboxyl group and a free hydroxyl group can be converted into diesters or salts thereof by known methods. Carboxyl groups may be esterfied, for example, by treatment with a diazoalkane, e.g. diazomethane, or by treatment with a lower alcohol in the presence of an esterfication catalyst, e.g. ethanol in the presence of hydrochloric acid. Compounds having free hydroxyl groups may be esterfied for example by treatment with an acid halide such as 3,4,5-dimethoxybenzoyl chloride, 3,4,5-trimethoxycinnamoyl chloride or acetylbromide. Compounds or salts thereof of the general formula given above may be isomerized to compounds of the general formula:

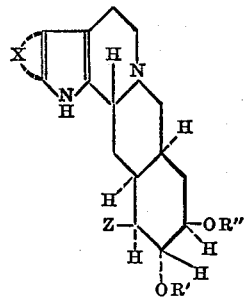

wherein X, Z, R' and R" have the above-given meanings, or salts thereof according to the procedure described and claimed in my copending application Serial No. 576,804, filed April 9, 1956 (now abandoned). These compounds like reserpine, deserpidine or rescinnamine are of great therapeutic value or represent intermediates in the preparation of such compounds into which they can be converted according to known methods, which are exemplified on the laevorotatory compounds in copending application Serial No. 526,780, filed August 5, 1955, by E. Schlittler, now U.S. Patent No. 2,824,874 of February 25, 1958.

Furthermore, the lactones or salts thereof obtained by the process of the invention can be isomerized to the lactones of the formula:

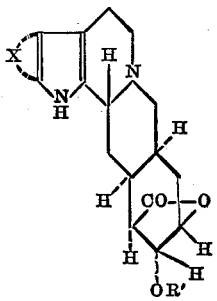

or salts thereof by the process described by R. B. Woodward et al., J. Amer. Chem. Soc. 78, 2023 (1956). The lactones thus obtained can be split and converted into therapeutically useful compounds or salts thereof according to the procedures outlined above for the compounds of the 3-iso-series or as indicated in the above publication of R. B. Woodward et al.

The new process for the preparation of the compounds outlined above makes them available as intermediates in the total synthesis of products such as reserpine, deserpidine or rescinnamine, which have activity as sedative and hypotensive agents.

The process of my invention consists in reducing a compound of the formula:

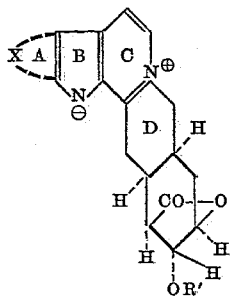

wherein X represents the unsubstituted or substituted remainder of a benzene nucleus and R' stands for lower alkyl, or salts thereof with a reducing agent capable of hydrogenating exclusively the non-indolic carbon-to-carbon double bonds in ring C.

The reduction of the tetradehydro-compounds is carried out preferably with reducing agents which will not affect the double bonds in rings A and B. Such reducing agents are for example of alkaline nature, such as dilight metal hydrides, e.g. sodium borohydride, alkali metals in alkanols or ammonia, or sodium amalgam in moist solvents. Catalytic hydrogenation can be employed as well, such as hydrogenation in the presence of a catalyst containing a metal of the eighth group of the periodic system or an oxide thereof, e.g. platinum, palladium, nickel or especially platinum oxide.

Depending upon the conditions used the lactone may be hydrolyzed or alcoholized and the product of the reduction step may be the corresponding 18-hydroxy-16-carboxylic acid or the alkyl 18-hydroxy-16-carboxylate. The lactone ring may be split especially by using an alkaline medium in the reduction step, such as catalytic hydrogenation in the presence of an alkaline or earth alalkaline metal hydroxide such as sodium hydroxide or by using an alkali metal in the presence of an alkanol.

The starting material can be used in the form of the optically active antipode or the racemate. Racemates obtained in any stage of the process can be resolved to the optically active antipodes and may be used in either form of the remaining steps. Final compounds, if racemates, may also be resolved. The usual method for resolving is used, e.g. the reaction of the racemate with an optically active base or acid, as the case may be and separating the diastereoisomeric compounds by fractional crystallization, and setting free the desired optically active compound.

Depending upon the working conditions employed, the new compounds are obtained in the form of the free bases or the quaternary salts. From the salts the free bases can be obtained in the usual manner; the free bases can be converted into their salts, for example, those with organic or inorganic acids, such as hydrohalic acids, sulfuric acid, phosphoric acid, nitric acid, hydroxyethane sulfonic acid, toluene sulfonic acid, acetic acid, tartaric acid, oxalic acid, or citric acid and the like, for example by treating the bases with the corresponding acids. Products obtained having a free carboxylic acid group may be obtained in the form of their metal salts such as sodium or potassium salts, which yield the free carboxylic acid upon treatment with an acid.

The tetradehydro compounds of the formula:

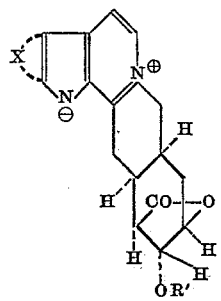

wherein X and R' have the meanings given above, and salts thereof, used as starting materials in the process of the invention can be synthesized by different routes from known compounds. For example acids of the formula:

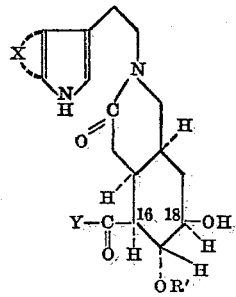

wherein X and R' have the meanings given above and Y stands for a residue capable of being split off together with the hydrogen of the 18-hydroxyl group to form [16β→18β]-lactones can be converted into the [16β→18β]-lactone and the latter be treated with a ring closing agent such as phosphorus oxychloride to form compounds of the formula:

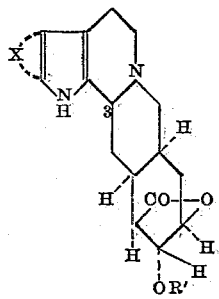

having a double bond extending from carbon atom 3 such as compounds of the formula:

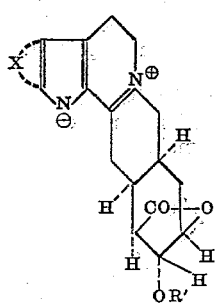

or salts thereof. The formation of the tetradehydro compounds is then accomplished by way of dehydrogenation. This is preferably done by treating the compounds having a double bond extending from position 3 with dehydrogenating agents capable of transforming compounds having the yohimbine ring structure into the corresponding py-tetradehydro-compounds, for example yohimbine into py-tetradehydro-yohimbine. Such agents are especially lead tetraacylates, such as lead tetraacetate, lead dioxide in acetic acid or maleic acid in the presence of palladium black, or, furthermore, oxygen in acetic acid in the presence of a platinum catalyst, and more generally oxidation agents having a potential of about −1.7 volts or higher and being otherwise appropriate for the dehydrogenation of the above-mentioned compounds.

Alternatively amides of the formula:

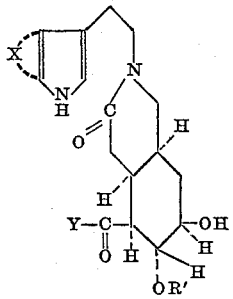

wherein X and R' have the above-mentioned meanings and Y stands for a residue being split off together with the hydrogen atom of the hydroxyl group in position 18 to form a (16β→18β)-lactone, such as a hydroxyl or alkoxy group, can be treated with a ring closing agent such as phosphorous oxychloride. The compounds thus formed having the formula:

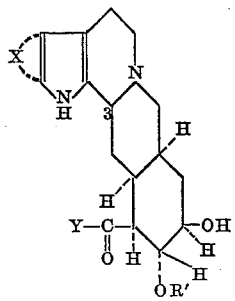

with a double bond extending from carbon atom 3 such as compounds of the formula:

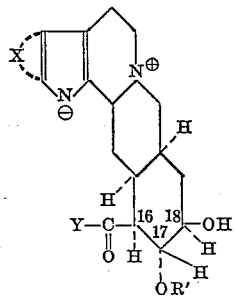

or salts thereof are then dehydrogenated according to the procedure given above. From the tetradehydro compounds the lactones of the formula:

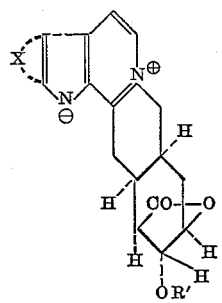

or salts thereof can be obtained by treatment with a lactonizing agent. To accomplish, for example, the splitting off of a hydroxyl group together with the hydrogen atom there are used dehydrating agents such as acid anhydrides or halides, e.g. acetic anhydride, thionyl chloride, phosphorous oxyhalides or a carbodiimide such as dicyclohexyl-carbodiimide. In case Y being alkoxy the corresponding alcohol is split off to form the lactone, for example by heating the compound with or without the use of a solvent, preferably in the presence of a lactonizing catalyst such as a higher alcoholate, for example, aluminum phenolate or aluminum tertiary butoxide, or under other appropriate alkaline or acidic conditions.

The starting materials for the formation of the py-tetradehydro-lactones used in the synthesis of the 3-isolactones are known and may be obtained according to the following procedure: quinone is reacted with 1,4-butadiene-1-carboxylic acid in a Diels-Alder addition. The 6,9 - dioxo-1,4,5α,6,9,10α-hexahydronaphthalene-1β-carboxylic acid of the formula:

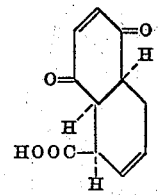

is then reduced with sodium borohydride to 6β-hydroxy-9-oxo-1,4,5α,6,9,10α-hexahydronaphthalene-1β-carboxylic acid, yielding by oxidation with perbenzoic acid 2,3α-oxido-6β-hydroxy - 9 - oxo-1,2,3,4,5α,6,9,10α-octahydronaphthalene-1β-carboxylic acid of the formula:

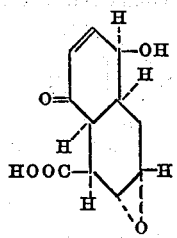

This compound, after esterification with diazomethane is subjected to a Meerwein-Pondorf reduction with aluminum isopropoxide to yield the (1β→9β)-lactone of 3,6β-oxido-9β-hydroxy-3,4,5α,6,9,10α - hexahydronaphthalene-1β-carboxylic acid of the formula:

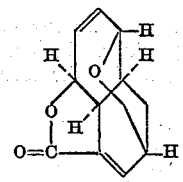

which by addition of a lower alkanol to the double bond in 1-position is converted into a (1β→9β)-lactone of 2α-lower alkoxy-3,6β-oxido - 9β - hydroxy-1,2,3,4,5α,6,9,10α-octahydronaphthalene-1β-carboxylic acid. Addition of bromohydrine to the double bond in 7-position results in the (1β→9β)-lactone of 2α-lower alkoxy-3,6β-oxido-7α-bromo-8β, 9β - dihydroxy-1,2,3,4,5α,6,7,8,9,10α-decahydronaphthalene-1β-carboxylic acid. Oxidation with chromic acid to the corresponding 8-oxo-compound, followed by reduction with zinc and acetic acid yields 2α-lower alkoxy-3β-hydroxy-8-oxo-1,2,3,4,5α,8,9,10α - octahydronaphthalene-1β-carboxylic acid of the formula:

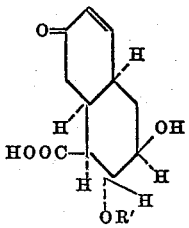

Esterification with diazomethane, acetylation with acetic acid anhydride in pyridine, oxidation with osmium tetroxide and oxidative degradation with periodic acid gives 2α - lower alkoxy-3β-acetoxy - 5β - aldehydo-6β-carboxymethyl-cyclohexane - 1β - carboxylic acid methyl ester. This after esterification with diazomethane is condensed with a tryptamine of the formula:

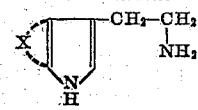

wherein X has the aforesaid meaning to yield a compound of the formula:

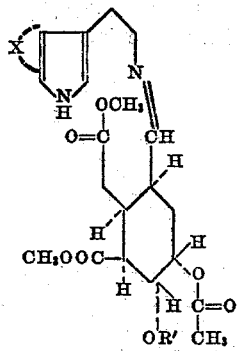

Reduction with sodiumborohydride and ring closure with heating results in a compound of the formula:

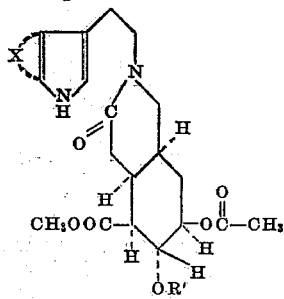

which can be hydrolyzed to the free hydroxy acid by treatment with sodium methylate in methanol under anhydrous conditions.

Included in the scope of my invention are the optically active or racemic products obtained by the process described hereinbefore having the formula:

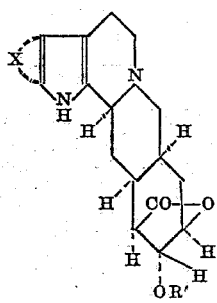

wherein X forms with the rest of the molecule the remainder of an unsubstituted or substituted benzene nucleus and R' stands for lower alkyl, such as compounds of the formula:

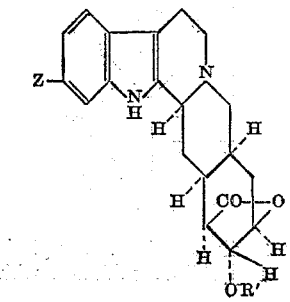

wherein Z represents hydrogen or a methoxy group and R' has the meaning given above, and salts of such compounds.

My invention also comprises the optically active or racemic tetradehydro compounds used as starting materials in the process which have the formula:

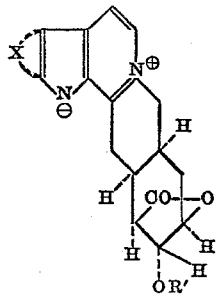

wherein X represents the unsubstituted or substituted remainder of a benzene nucleus and R' stands for lower alkyl, and the salts thereof. Such compounds are more especially lactones of the formula:

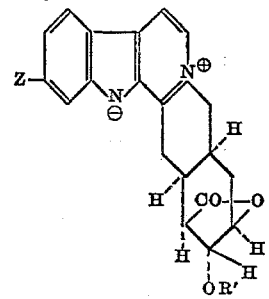

wherein Z and R' have the above-mentioned meanings and salts thereof. As salts there are contemplated for example those of the hydrohalic acids, e.g. hydrochloric acid, nitric acid, sulfuric acid, phosphoric acids, perchloric acid, acetic, citric, oxalic, tartaric, ascorbic, methane sulfonic, hydroxyethane sulfonic, p-toluene sulfonic acid or salicylic, p-aminosalicylic acid or acetylsalicylic acid.

The invention comprises also any process, wherein an intermediate obtainable at any stage of the process is used as starting material and the remaining steps are carried out.

This application is a continuation-in-part of my co-pending application Serial No. 576,835, filed April 9, 1956 (now abandoned).

The examples which follow are given in the way of illustration and shall not be construed as a limitation. Many modifications will appear obvious to the man skilled in the art and it is intended that such obvious modifications are also comprised by my invention. Temperatures are given in degrees centigrade.

*Example 1*

To a solution of 1 g. of tetradehydro reserpic acid lactone chloride in 50 ml. of methanol is added slowly 0.5 g. of sodium borohydride. After refluxing for 15 minutes most of the methanol is evaporated under reduced pressure. Water is added and the mixture is extracted twice with a total of 500 ml. of chloroform. The chloroform extract is washed with water, dried over sodium sulfate and evaporated to dryness under reduced pressure. The crude iso-reserpic acid lactone is recrystallized from a large amount of chloroform, M.P. 215–216°.

The tetradehydro reserpic acid lactone used as the starting material in the example can be obtained according to the following procedure:

5 g. of N-[2'-(6''-methoxy-3''-indolyl)-ethyl]-3-oxo-5β - carbomethoxy - 6α-methoxy-7β-acetoxy-1,2,3,4,5α,6β, 7α,8,9α,10α - decahydro-isoquinoline are refluxed with 13.2 g. of potassium hydroxide in 200 ml. of methanol for two hours. After cooling the solution is acidified with hydrochloric acid (1:1), the potassium chloride is filtered off and the residue thoroughly washed with 200 ml. of a 1:1-mixture of chloroform and methanol. The combined methanol-chloroform portions are evaporated to dryness under reduced pressure. The residue is then crystallized from a 1:1-mixture of chloroform and methanol by the addition of hexane yielding N-[2'-(6''-methoxy-3''-indolyl)-ethyl]-3-oxo-5β-carboxy-6α-methoxy-7β-hydroxy-1,2,3,4,5α,6β,7α,8,9α,10α-decahydro-isoquinoline.

1 g. of the latter is dissolved in a mixture of 20 ml. of dry pyridine and 5 ml. of acetic anhydride by warming. After standing for 16 hours the solution is concentrated under reduced pressure to dryness whereupon the [5β→7β]-lactone of N-[2'-(6''-methoxy-3''-indolyl)-ethyl]-3-oxo-5β-carboxy-6α-methoxy-7β-hydroxy-1,2,3,4,5α,6β,7α,8,9α,10α-decahydroisoquinoline crystallizes. The compound is recrystallized from methanol.

To 0.8 g. of this lactone are added 100 ml. of benzene and 10 g. of phosphorous oxychloride. After standing at 22° for twelve hours, the mixture is heated on the steam bath for two hours, cooled and then evaporated to dryness under reduced pressure. The residue is taken up in five successive portions of hot aqueous hydrochloric acid (10 ml. each), the extracts are cooled, concentrated under reduced pressure at 30° to about one-fifth of the original volume and then chilled in ice. The crystalline didehydro-reserpic acid lactone chloride is isolated by filtration.

To a solution of 2 g. of the didehydroreserpic acid lactone in 50 ml. of acetic acid held at 35° are added while stirring 100 ml. of an 0.036 M solution of lead tetraacetate in acetic acid. After disappearance of the oxidant, the acetic acid is distilled off under reduced pressure until a total volume of about 10 ml. remains. The solution is diluted with 150 ml. of chloroform and made alkaline to pH 9 to 10 by the careful addition of 50 percent aqueous sodium hydroxide with cooling and agitation. The chloroform layer is separated, washed with a small amount of water and acidified to pH 3 with 3 N ethanolic hydrogen chloride. Evaporation of the solvent to dryness under reduced pressure leaves the crude tetradehydro reserpic acid lactone chloride which may be recrystallized from boiling water by the addition of hydrochloric acid to turbidity and slowly cooling.

The 3-iso-reserpic acid lactone obtained can be converted to reserpine, for example, by the following procedure:

0.1 g. of 3-iso-reserpic acid lactone is refluxed in 5 ml. of acetic acid for 16 hours. The acetic acid is distilled off to a small volume, water added and the mixture basified with ammonium hydroxide. The mixture is extracted with chloroform, the chloroform distilled off and the resulting crystalline reserpic acid lactone collected by filtration after the addition of methanol. It is recrystallized from acetone and melts at 305–310°.

To 0.1 g. of reserpic acid lactone is added a solution of 0.05 g. of sodium methylate in 25 ml. of methanol. The mixture is refluxed for one and one-half houre whereupon the lactone completely dissolves. The solution is cooled to room temperature, adjusted to pH 6–7 with hydrochloric acid (1:1) and concentrated under reduced pressure to a volume of 3 ml. 25 ml. of water is added and the solution is acidified to pH 4–5 with hydrochloric acid (1:1). Ammonia is added and the solution having a pH of 9–10 is extracted four times with a total amount of 60 ml. of chloroform. The chloroform solution is dried over sodium sulfate and evaporated under reduced pressure whereupon methyl reserpate is obtained.

To a solution of 0.1 g. of methyl reserpate in 2 ml. of dry pyridine are added slowly with cooling 2 ml. of a pyridine solution containing 0.260 g. of 3,4,5-trimethoxybenzoyl chloride. The reaction mixture is allowed to stand at room temperature for 66 hours. At the end of that time 20 ml. of water are slowly added and the resulting solution distilled to dryness under reduced pressure at 40°. The residue is taken up in chloroform and washed successively with water, 1 percent aqueous sodium hydroxide solution and water. After drying, the solvent is removed under reduced pressure at 40° leaving a semi-crystalline residue. Upon recrystallization from acetone pure reserpine is obtained.

*Example 2*

To a solution of 0.1 g. of tetradehydroreserpic acid lactone in 5 ml. of chloroform and 5 ml. of methanol is added 0.05 g. of sodium borohydride. The mixture is allowed to stand at room temperature for two hours, evaporated to a small volume, diluted with water and extracted with chloroform. Removal of the chloroform by distillation gives the crude 3-iso-reserpic acid lactone as a residue, which on recrystallization from methanol-water melts at 215–216°.

The tetradehydro-reserpic acid lactone used as starting material can be obtained according to the following procedure:

To a solution of 0.5 g. of tetradehydro-reserpic acid hydrochloride in 20 ml. of a 9:1-mixture of pyridine-water is added 0.5 g. of dicyclohexyl-carbodiimide. The reaction mixture is allowed to stand 3 days at room temperature. The dicyclohexylurea is filtered off, washed with a small amount of pyridine and the combined pyridine solutions evaporated to a small volume under reduced pressure. 5 ml. of water are added and the mixture is made basic to pH 9 by the addition of 6 N potassium hydroxide. The suspension is extracted with chloroform, the chloroform layer washed with water, dried over sodium sulfate, and the chloroform evaporated to dryness. After addition of methanol the tetradehydro-reserpic acid lactone filtered off and is recrystallized from a mixture of chloroform-methanol to give the light-yellow tetradehydro-reserpic acid lactone melting at 265–270°.

The 3-iso-reserpic acid lactone obtained according to the above-described procedure can be converted into reserpine for example by the method described in Example 1.

What is claimed is:

1. A member selected from the group consisting of compounds of the formula:

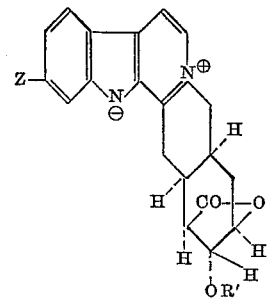

wherein Z stands for a member selected from the group consisting of hydrogen and methoxy and R' represents lower alkyl, and salts with inorganic acids thereof.

2. The compound of the formula:

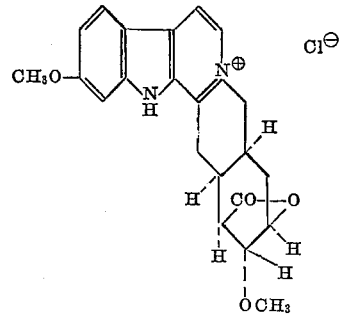

(References on following page)

References Cited in the file of this patent

UNITED STATES PATENTS

| | | |
|---|---|---|
| 2,786,843 | Huebner | Mar. 26, 1957 |
| 2,788,347 | MacPhillamy | Apr. 9, 1957 |
| 2,796,420 | Weisenborn | June 18, 1957 |

OTHER REFERENCES

Jour. Amer. Chem. Soc., vol. 77, pp. 4335–4343 (1955).

Jour. Amer. Chem Soc., vol. 77, pp. 1071–72 (1955).

Experientia, vol. 11, #8, 1955, pp. 303–304.

Experientia, vol. 12, #7, 1956, pp. 249–50.

Woodward: Jour. Am. Chem. Soc., vol. 78 (May 1956), pp. 2023–2025.

UNITED STATES PATENT OFFICE
CERTIFICATION OF CORRECTION

Patent No. 2,986,562　　　　　　　　　　　　　　　May 30, 1961

Charles Ferdinand Huebner

It is hereby certified that error appears in the above numbered patent requiring correction and that the said Letters Patent should read as corrected below.

Column 2, lines 51 to 63, the formula should appear as shown below instead of as in the patent:

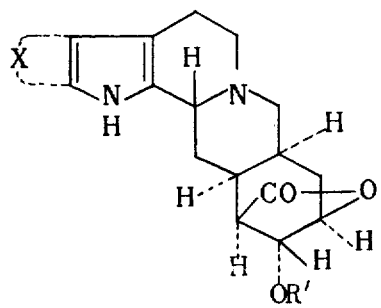

column 7, lines 12 to 26, the formula should appear as shown below instead of as in the patent:

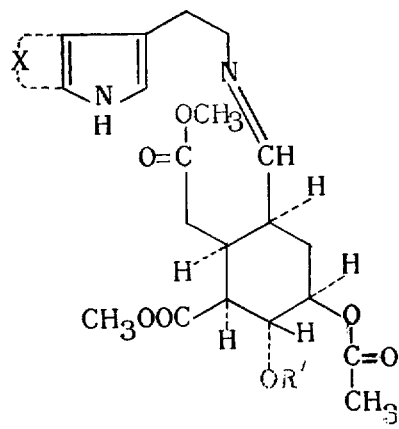

column 9, line 60, for "houre" read -- hours --.

Signed and sealed this 30th day of January 1962.

(SEAL)
Attest:

ERNEST W. SWIDER　　　　　　　　　　　　　DAVID L. LADD
Attesting Officer　　　　　　　　　　　　　　Commissioner of Patents